Patented Jan. 30, 1940

2,188,772

UNITED STATES PATENT OFFICE 2,188,772

METHOD OF DISTILLING MIXTURES CONTAINING VINYL AROMATIC HYDROCARBONS

Robert R. Dreisbach and James E. Pierce, Midland, Mich., assignors to The Dow Chemical Company, Midland, Mich., a corporation of Michigan No Drawing. Application October 28, 1938, Serial No. 237,580

6 Claims. (Cl. 202—57)

This invention concerns a method of separating vinyl aromatic hydrocarbons, particularly styrene, from hydrocarbon mixtures containing the same by fractional distillation.

It is well known that styrene, either alone or mixed with other aromatic hydrocarbons, such as ethyl benzene, tends to polymerize to a considerable extent upon standing or upon exposure to elevated temperatures. In order to minimize this difficulty, it is usual practice to add to freshly prepared styrene any of a number of organic agents such as quinone, trinitrobenzene, etc., which are known to retard the polymerization. In many instances, however, these agents cannot satisfactorily be separated from the styrene when it is later desired to polymerize the latter. For this reason, the storage and shipment of styrene or styrene mixtures in stabilized form, and subsequent recovery of the styrene in readily polymerizable form, has constituted a serious problem.

A partial solution to this problem, applicable in the case of substantially pure styrene, is described by J. W. Britton et al. in a co-pending application Serial No. 98,340, filed August 28, 1936. In this application, it is disclosed that substantially pure monomeric styrene may be stabilized against polymerization during storage or shipment, by dissolving therein a small proportion of sulfur, and that thereafter the styrene may be distilled from the solution to recover the styrene as distillate in readily polymerizable form.

We have now discovered that sulfur is also a satisfactory inhibitor for use with mixtures of styrene or other vinyl aromatic hydrocarbons with other aromatic hydrocarbons. That is, we have found that hydrocarbon mixtures consisting of a substantial proportion of a vinyl aromatic hydrocarbon together with one or more other aromatic hydrocarbons, may be stabilized against polymerization by dissolving therein a small proportion of sulfur. This solution may then be fractionally distilled to separate and recover the vinyl aromatic compound in readily polymerizable form.

The term "vinyl aromatic hydrocarbon", as herein employed, refers to any hydrocarbon having the structure

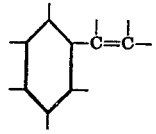

e. g., ethyl vinyl benzene, isopropyl vinyl benzene, diethyl vinyl benzene, divinyl benzene, styrene, etc.

In carrying out the invention, solution of the sulfur in the hydrocarbon mixture to be stabilized may be accomplished by agitating or grinding such mixture with sulfur, or merely by permitting the mixture to stand in contact with sulfur. Finely divided sulfur, e. g. flowers of sulfur or colloidal sulfur, dissolves more readily than do the coarse forms of the material, but sulfur in any form may be employed. A mere trace, e. g. 0.001 per cent by weight of dissolved sulfur is sufficient to inhibit polymerization of the vinyl aromatic hydrocarbon in the mixture, but in practice we prefer to add 0.01–5.0 per cent by weight of sulfur to the mixture.

The hydrocarbon mixtures stabilized with sulfur may be stored at room temperature over long periods of time, e. g. for weeks or months, without any appreciable polymerization of the vinyl aromatic hydrocarbon taking place. Likewise, when it is desired to separate the vinyl aromatic hydrocarbon in readily polymerizable form, the stabilized solution may be distilled, preferably at reduced pressure, without any substantial loss of product, the sulfur serving to inhibit polymerization of the vinyl compound during the process. The distillation may be conducted equally well in laboratory equipment or on any scale in ordinary commercial apparatus fabricated of iron, steel, lead, nickel, etc.

The process of our invention is applicable generally to hydrocarbon mixtures consisting of a substantial proportion of styrene or other vinyl aromatic hydrocarbon, e. g. at least 10 per cent by weight, together with at least one other aromatic hydrocarbon. Examples of such other aromatic hydrocarbons are benzene, toluene, ethyl benzene, isopropyl benzene, diethyl benzene, allyl benzene, phenyl acetylene, naphthalene, etc. The vinyl aromatic hydrocarbon-aromatic hydrocarbon mixtures treated in our process may be preformed mixtures or may be derived from any suitable source, e. g. by pyrolysis of ethyl or isopropyl benzene, by the destructive distillation of storax, etc. Hydrocarbon mixtures which contain appreciable proportions of non-hydrocarbon materials, such as halo-hydrocarbons, have not been found operable in the invention.

The following example is illustrative of our invention, but is in no sense limitative thereof.

Example

A 336 pound portion of a styrene-aromatic hydrocarbon mixture derived from the pyrolysis of ethyl benzene (and containing about 78 per cent by weight of styrene, 15 per cent of ethyl benzene, and a minor proportion of other hydrocarbons) was agitated with 5 pounds of sulfur. This mixture was allowed to stand at room temperature for several months. At the end of this time, no appreciable formation of polystyrene in the mixture was observed.

The mixture was then fractionally distilled at 100 millimeters absolute pressure by conventional procedure in iron equipment. The following table characterizes the styrene-containing fractions of the distillate collected.

| Fraction | Weight in pounds | Per cent of styrene in fraction |
| --- | --- | --- |
| 1 | 18.8 | 80 |
| 2 | 23.8 | 86 |
| 3 | 22.8 | 92.7 |
| 4 | 31.0 | 95.4 |
| 5 | 25.9 | 95.4 |
| 6 | 114.0 | 97 |
| 7 | 9.8 | 93.1 |

In the distillation, 87.5 per cent of the styrene present in the original mixture was recovered as distillate. Fractions 4 to 7 could all be readily polymerized by customary procedure.

It will be understood that the foregoing description is illustrative rather than limitative, and that our invention is co-extensive in scope with the following claims.

We claim:

1. The method which comprises dissolving sulfur in a hydrocarbon mixture substantially free of non-hydrocarbon materials and consisting of a substantial proportion of a vinyl aromatic hydrocarbon together with at least one other aromatic hydrocarbon to form a solution containing between about 0.01 and about 5.0 per cent of sulfur and thereafter fractionally distilling the solution to recover the vinyl aromatic hydrocarbon as distillate in readily polymerizable form.

2. The method which comprises dissolving sulfur in a hydrocarbon mixture substantially free of non-hydrocarbon materials and consisting of a substantial proportion of styrene together with at least one other aromatic hydrocarbon to form a solution containing between about 0.01 and about 5.0 per cent of sulfur and thereafter fractionally distilling the solution to recover styrene as distillate in readily polymerizable form.

3. The method which comprises dissolving sulfur in a hydrocarbon mixture substantially free of non-hydrocarbon materials and consisting of at least 10 per cent by weight of styrene and at least one other aromatic hydrocarbon to form a solution containing between about 0.01 per cent and 5.0 per cent of sulfur and thereafter fractionally distilling the solution to recover styrene as distillate in readily polymerizable form.

4. The method which comprises dissolving sulfur in a hydrocarbon mixture substantially free of non-hydrocarbon materials and consisting essentially of ethyl benzene and at least 10 per cent by weight of styrene to form a solution containing between about 0.01 per cent and about 5.0 per cent sulfur and thereafter fractionally distilling the solution to recover styrene as distillate in readily polymerizable form.

5. The method which comprises distilling a solution substantially free of non-hydrocarbon materials and consisting of a substantial proportion of a vinyl aromatic hydrocarbon together with at least one other aromatic hydrocarbon, to which between about 0.01 and about 5.0 per cent of sulfur has been added as a polymerization inhibitor, to recover the vinyl aromatic hydrocarbon as a distillate in readily polymerizable form.

6. The method which comprises distilling a solution substantially free of non-hydrocarbon materials and consisting of a substantial proportion of styrene together with at least one other aromatic hydrocarbon, to which between about 0.01 and about 5.0 per cent of sulfur has been added as a polymerization inhibitor, to recover the styrene as a distillate in readily polymerizable form.

ROBERT R. DREISBACH.
JAMES E. PIERCE.